C. H. SMALLWOOD.
CORN PLANTER.
APPLICATION FILED MAR. 29, 1916.

1,209,507.

Patented Dec. 19, 1916.
4 SHEETS—SHEET 1.

Fig. 1.

Witnesses

Inventor
C. H. Smallwood
By
Attorney

C. H. SMALLWOOD.
CORN PLANTER.
APPLICATION FILED MAR. 29, 1916.

1,209,507.

Patented Dec. 19, 1916.
4 SHEETS—SHEET 3.

Witnesses
J. P. Wahler
Rohe Meyer

Inventor
C. H. Smallwood.
By
Attorney

UNITED STATES PATENT OFFICE.

CHARLES H. SMALLWOOD, OF INDEPENDENCE, MISSOURI.

CORN-PLANTER.

1,209,507.  Specification of Letters Patent. Patented Dec. 19, 1916.

Application filed March 29, 1916. Serial No. 87,493.

*To all whom it may concern:*

Be it known that I, CHARLES H. SMALLWOOD, a citizen of the United States, residing at Independence, in the county of Jackson and State of Missouri, have invented certain new and useful Improvements in Corn-Planters; and I do hereby declare the following to be a full, clear, and exact description of the invention, such as will enable others skilled in the art to which it appertains to make and use the same.

This invention relates to corn planters, and the primary object of the invention is to provide a corn planter which will plant the corn in hills or check rows without the employment of knotted wire as is ordinarily employed.

Another object of this invention is to provide a corn planter as specified wherein the front wheels of the planter are operatively connected through the medium of universal joints with the dropping shaft, so that the dropping or dispensing of the kernels of corn will normally be controlled by the rotation of the front wheels.

A further object of this invention is to extend the axles upon which the front wheels are mounted beyond the rear supporting wheels of the corn planter, so that when making a second trip across a field, one of the front wheels will travel over the mark made thereby upon the previous trip across the field, for insuring the proper spacing of the rows of planted grain; and also to attach marker plates to the front wheels which will make a mark upon the ground at the time of the dropping of the grain, so that all of the hills in all of the rows may be in proper alinement with each other.

A further object of this invention is to provide means for rotating the front wheels, when the planter is stationary, by the operation of a hand lever, for properly spacing the marker in alinement with the mark made thereby on a previous trip, and also to provide means controlled by the operation of foot levers by means of which the rotation of the front wheels may be regulated for bringing them into the proper position so that the marker will aline with the marks previously made, while the planter is traveling.

A still further object of this invention is to provide a corn planter wherein an auxiliary frame that carries the seed dispensing structures and the front wheel is pivotally connected to the main supporting frame of the planter, so that it may be moved into an inoperative and non-ground engaging position, when it is desired to turn a corner, or turn the planter for planting back across a field.

Other objects of the invention are: to provide means for regulating the number of grains dropped upon each operation of the corn planting or dispensing structure which means includes a cam having a double face which is adjustable for engagement with a dispensing plate operating lever; to provide a planter wherein a lower valve structure is carried by the furrow opening shoe and is operated directly after the operation of the seed dispensing plate for permitting the grains or kernels of corn to be dropped into the ground; and to provide a novel structure for permitting either of the front supporting wheels to move in a vertical manner independent of the other, when traveling over high or uneven places in the field, without in any way interfering with the operation of the operating shaft of the seed dispensing mechanism.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1:
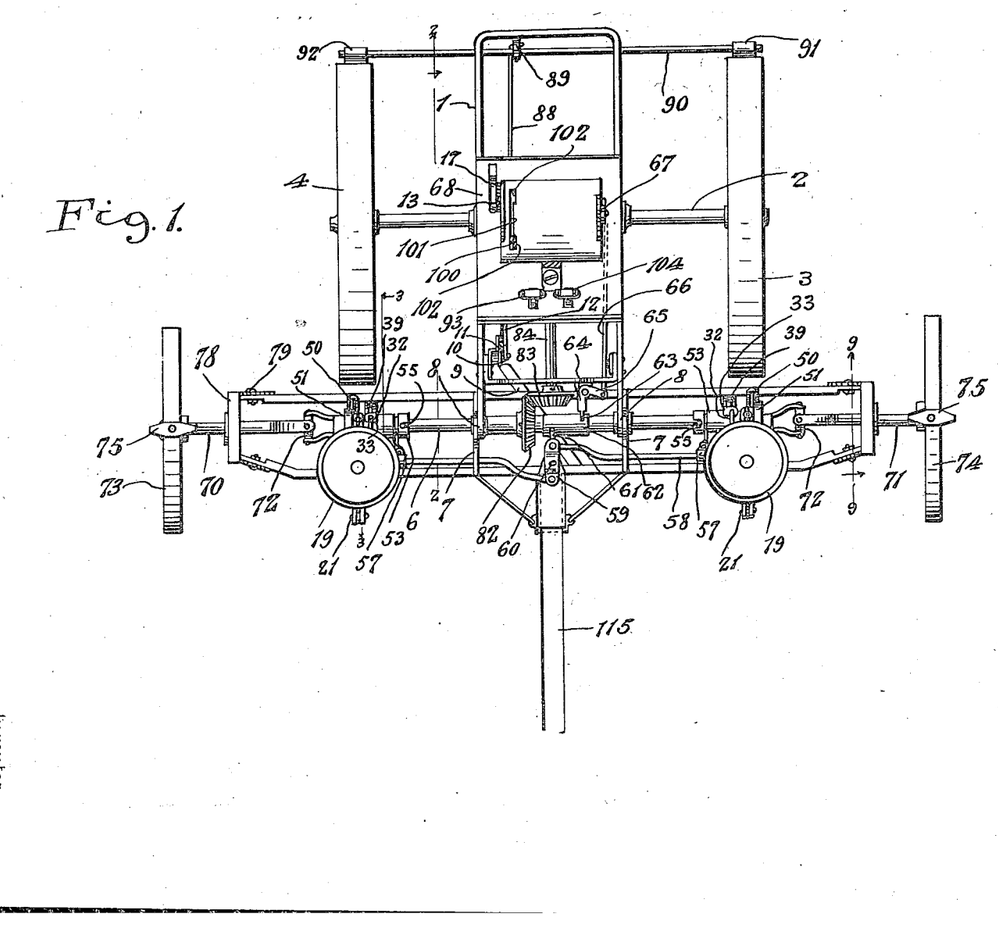
Figure 1 is a top plan view of the improved corn planter.
Figures 2, 5, 7:
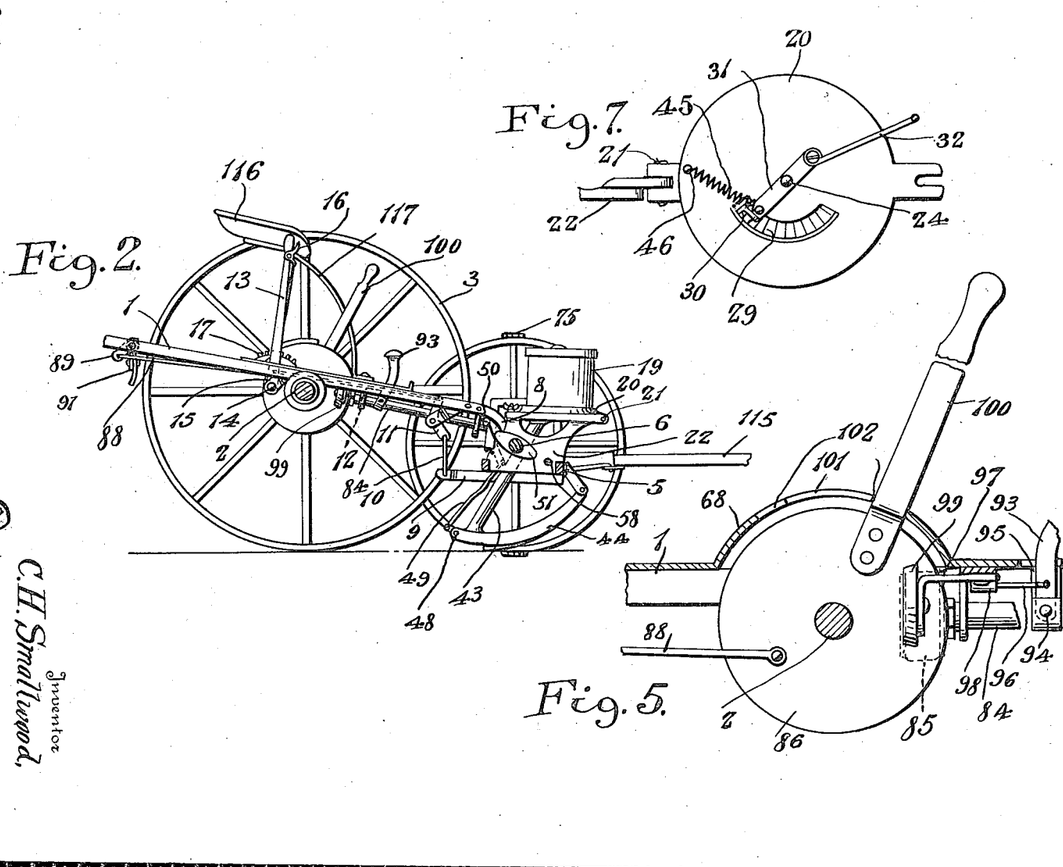
Fig. 2 is a sectional view on the line 2—2 of Fig. 1.
Fig. 5 is a vertical section through a part of the structure shown in Fig. 4.
Fig. 7 is a bottom plan view of the seed dispensing structure.
Figure 3:
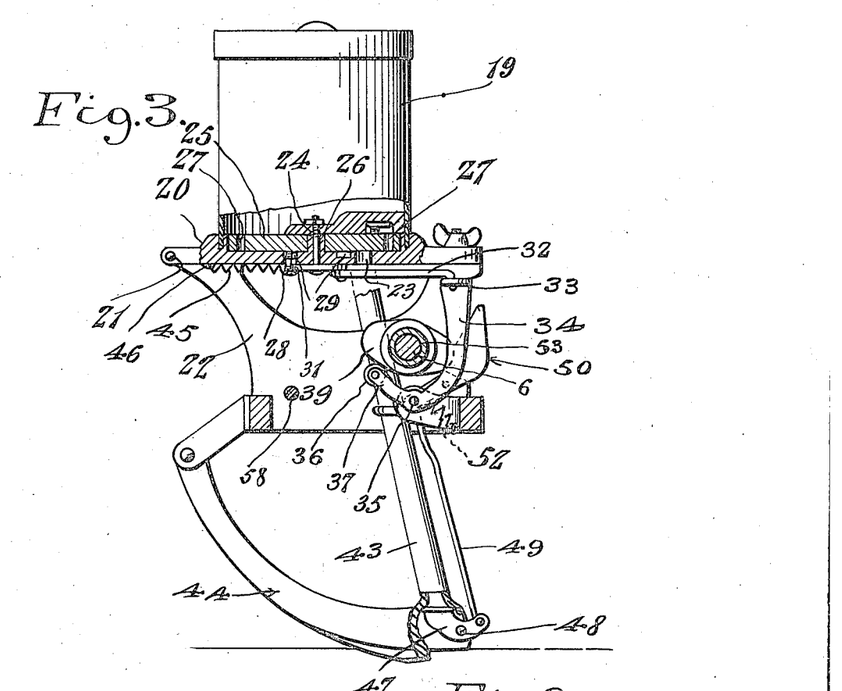
Fig. 3 is an enlarged view partly in section taken on the line 3—3 of Fig. 1.
Figures 4, 6, 8:
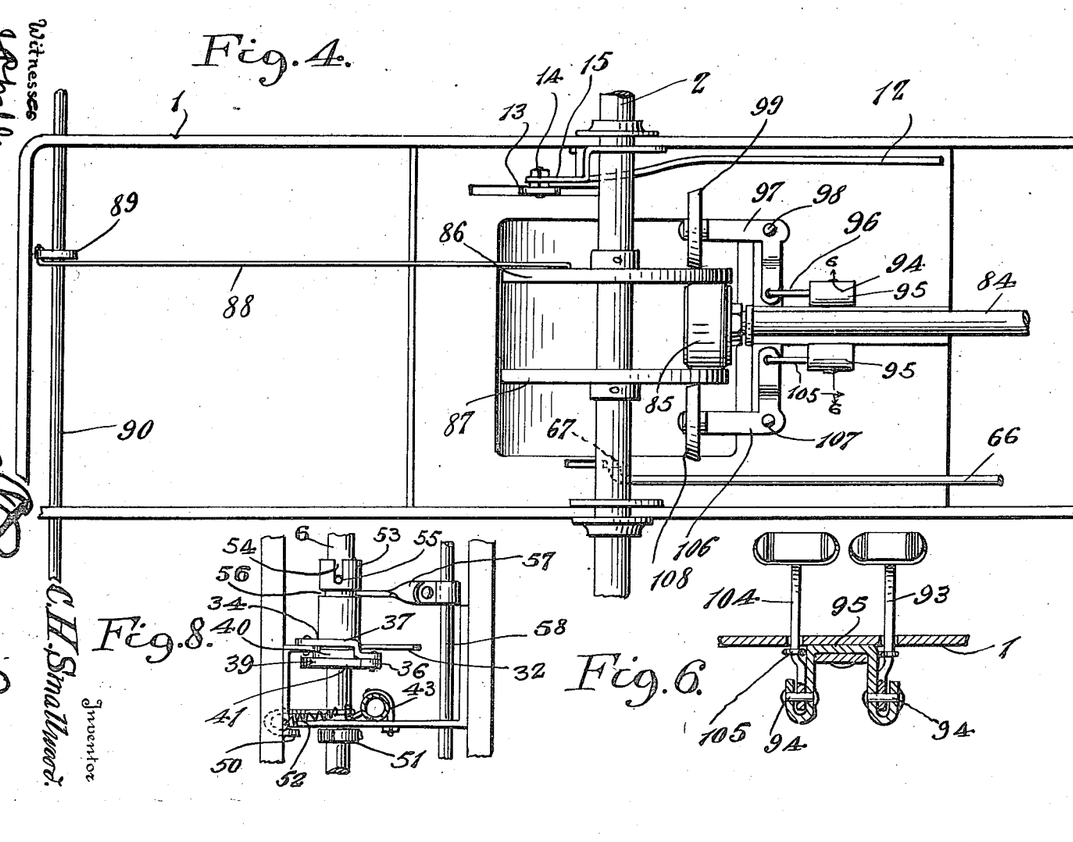
Fig. 4 is a fragmentary bottom plan of the planter.
Fig. 6 is a vertical section taken on the line 6—6 of Fig. 4.
Fig. 8 is a fragmentary bottom plan view of the seed dispensing structure.
Figures 9, 10:
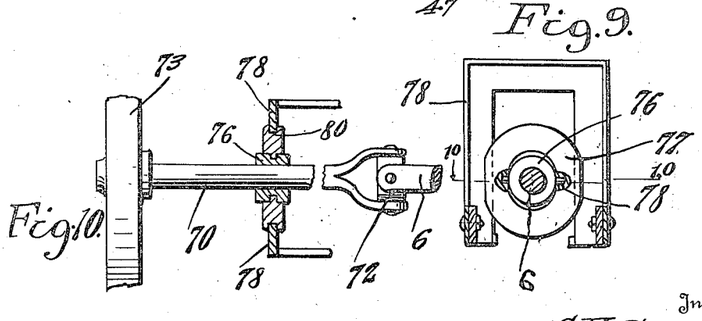
Fig. 9 is a section on the line 9—9 of Fig. 1.
Fig. 10 is a section on the line 10—10 of Fig. 9.

Referring more particularly to the drawings, 1 designates the ordinary supporting frame of the corn planter, which rotatably supports a main axle 2. The axle 2 has supporting wheels 3 and 4 mounted thereon. The supporting wheel 3 is mounted upon the axle 2 for rotation therewith, while the wheel 4 is loosely mounted upon the axle.

An auxiliary frame 5 is positioned forwardly of the supporting wheels 3 and 4, and it has a shaft 6 rotatably supported by suitable bearings 7, which are carried by the frame 5. The side rails of the supporting frame 1 of the corn planter are mounted upon the shaft 6 as is shown at 8, so as to permit of a pivoted movement of the auxiliary frame with respect to the main supporting frame 1.

The auxiliary frame 5 has an arm 9 connected to the under surface of the same substantially intermediate of its ends to which arm a rod 10 is connected. The rod 10 is in turn connected to a bell crank 11. A rod 12 is connected to the bell crank 11 and extends rearwardly, and is connected to a hand lever 13. The hand lever 13 is pivotally connected as shown at 14 to a depending arm 15, which is formed upon the frame 1, and it has a dog mechanism 16 carried thereby for association with a quadrant 17 for holding the lever in various adjusted positions. The oscillatory movement of the lever 13 will swing the auxiliary frame 5 upon its pivotal connection with the main supporting frame 1 for positioning the seed dispensing mechanism which is carried by the auxiliary frame in or out of an operative position.

The seed dispensing structures include hoppers 19, which are connected to the bases 20. The bases 20 are hingedly connected as shown at 21 to supporting plates 22 which are attached to the auxiliary supporting frame 5.

The construction of the seed dispensing structures is identical, and hereafter, only one of the seed dispensing structures will be described.

The base 20 is provided with an opening 23 extending centrally therethrough, through which opening a bolt 24 passes for attaching the rotary seed dispensing plate 25 to the base 20. The plate 25 is mounted upon an upstanding spindle 26 which is formed upon the base 20, and it is provided with a plurality of spaced openings 27, into which the kernels of corn fall. The rotary seed dispensing plate 25 has ratchet teeth 29 formed upon its under surface. The ratchet teeth 29 are engaged by a pawl 30, which is carried by an arm 31. The arm 31 is pivotally mounted upon the central bolt 24, and it has an arm 32 connected thereto. The arm 32 extends rearwardly from the arm 31 and has its rear end angled and connected to the upper horizontal end 33 of a pivoted member 34. The member 34 is pivotally supported as shown at 35, and it has a roller 36 connected to the upper end of the arm 37 of the same. The roller 36 is provided for riding over the peripheral edge of a double cam 39. The cam 39 is provided with two cam faces 40 and 41. The circumference of the cam face 41 is greater than the circumference of the cam face 40, so that when the member 34 is rocked by the engagement of the roller 36 with the circumference of the cam 41, the dispensing plate 25 will be rotated through a greater arc, than it will be rotated when the member 34 is rocked through the medium of the roller 34 traveling over the circumference of the cam 40. This construction is provided for regulating the number of kernels dispensed. The kernels of corn which are seated in the openings 27 formed in the rotary dispensing plate 25 travel downwardly through the opening 23 formed in the base 20, and fall into the substantially vertical spout 43 of the furrow opening shoe structure 44.

A spring 45 is connected to the arm 31 and to a pin 46 which is attached to the bottom 20 of the hopper structure, for automatically returning the arm 31 and the pawl 30 carried thereby to their normal position for reoperating the seed dispensing plate 25 upon an engagement of the roller 36 by the portions of the cam 40 or 41 having the greatest radius.

A valve member 47 is pivotally mounted as at 48 in the lower end of the spout 43, and it has a rod 49 connected thereto and extending upwardly therefrom, which rod is connected to a pivotally mounted pawl 50. The pawl 50 is pivotally carried by the auxiliary supporting frame 5, and it is positioned in the path of a cam 51 which is mounted upon the shaft 6 and is provided for operating the pawl 50 at predetermined times, for moving the valve member 47 upon its pivotal support for permitting the grain to fall out of the chute 43 into the ground or furrow formed by the furrow opening shoe 44. A spiral spring 52 is connected to the pawl 50 for automatically returning it, after it has been operated by the cam 51.

The cam 39 is mounted upon a sleeve 53, which sleeve is in turn slidably mounted upon the shaft 6. The sleeve 53 is provided with a slot 54 in which is seated a pin 55 which extends through the shaft 6. The pin 55 and the slot 54 coact for guiding the movement of the sleeve 53 and preventing it from rotating upon the shaft 6. The sleeve 53 is provided with an angular recess 56, in which is seated a forked end of an arm 57. The arm 57 is connected to a rod 58, which rod extends transversely of the planter and is connected to an arm 59 which is pivotally mounted as shown at 60 upon the auxiliary frame 5. The arm 60 has a pin 61 formed upon one end thereof which pin is connected to a sliding sleeve 62. The sleeve 62 is slidably mounted upon the shaft 6, and is provided with a semi-angular recess or opening 63 in which the reduced end of the arm 64 of bell crank 65 is seated. A rod 66 is connected to the bell crank 65 and extends rearwardly of the supporting frame 1, being connected to a hand lever 67 which is pivotally carried by the platform 68. The platform 68 is supported by the supporting frame 1. The lever 67 is provided for shifting the sleeve 62, which in turn shifts the sleeve 53 for moving the cam structure 37, so that the roller 36 will engage the cam structure 39, so that the roller 36 will engage either the cam face 40 or 41, depending upon the number of seeds which it is desired to deposit in each hill planted by the planter.

The shaft 6 has stub axles 70 and 71 connected to its ends through the medium of universal joints 72. The stub axles 70 and 71 have the front supporting wheels 73 and 74 mounted thereon. The wheels 73 and 74 have marker plates 75 secured thereto and spaced diametrically opposite of each other, which marker plates are adapted for engagement with and for making the mark upon the ground, at the time the seeds are permitted to drop out of the spout or chute 43 by the action of the valve 47 for indicating the position at which each hill of corn is planted.

The axles 70 and 71 are rotatably supported by bearing collars 76 which bearing collars are in turn connected to cross heads 77 through the medium of pins 78'. The cross heads 77 are slidably supported for vertical movement by frames 78 which frames are attached in any suitable manner as indicated at 79 to the auxiliary supporting frame 5. The cross heads 77 are provided with vertically extending grooves 80 formed in their side edges which grooves receive the edges of the vertical sides of the frame 78, for permitting of a vertical sliding movement of the cross heads and presenting lateral movement thereof. The cross head structures and the universal joints 72 will permit either of the supporting wheels 73 or 74 to move in a vertical plane independent of the other and without in any way displacing the shaft 6, so as to permit the wheels to travel over rough or uneven places in the field without interfering with the operation of the seed dispensing structures, the shaft 6 has a beveled gear 82 mounted thereon which meshes with a beveled gear 83 mounted upon a shaft 84. The shaft 84 extends rearwardly from the shaft 6, at right angles thereto and it has a friction wheel 85 mounted upon its ends and remote from the beveled gear 83. The friction wheel 85 is adapted for frictional engagement with the faces of friction wheels 86 and 87 which are mounted upon the axle 2 of the planter. The friction wheel 87 is mounted upon the axle 2 for movement therewith, while the friction disk 86 is loosely mounted upon the axle. A rod 88 is connected to the friction disk 86 and to an arm 89, which is mounted upon a rod 90. The rod 90 is rotatably supported by the frame 1 and it has brake shoes 91 and 92 mounted thereon which is for engagement with the supporting wheels 3 and 4 respectively. A foot lever 93 is pivotally supported as shown at 94, by a bracket 95, and it is connected through the medium of a rod 96 to a bell crank 97. The bell crank 97 is pivotally mounted as shown at 98 for movement in a horizontal plane and it has a friction roller 99 mounted upon its inner end which is adapted for engagement with the outer surface of the friction disk 86 for moving the friction disk 86 into engagement with the friction wheel 85 when the foot lever is depressed. A hand lever 100 is connected to the friction disk 86 and it extends upwardly through a slot 101 which is formed in the curved portion of the platform 68. The slot 101 has extensions 102 formed there upon its ends and extends inwardly therefrom, in which the hand lever 100 is seated when in an inoperative position.

The hand lever 100 is provided for manually rotating the friction disk 86. When starting a new row, it is sometimes necessary to adjust the markers 75 which are carried by the supporting wheels 73, so that they will aline with the mark formed thereby on a previous trip across the field, and this adjustment of the markers is accomplished through the rotation of the friction disk 86 as follows, the lever 13 is operated for moving the auxiliary frame 5 upwardly so that the furrow opening shoes 44 will be out of engagement with the ground, and the foot lever 93 is depressed which will force the friction wheel 99 into engagement with the friction disk 86 and move this disk into engagement with the friction wheel 85. When the friction disk 86 is moved into an engagement with the friction wheel 85, and the lever 100 is in either of the notches or extensions 102 of the slot 101, the rotation of the front wheels will be arrested, and these wheels will drag over the surface of the ground, until the marker carried thereby alines with the marks previously formed by the wheels, at which time the foot lever is released, and the planter is allowed to work in its normal manner. When the disk 86 is rotated by the oscillation of the hand lever 100, it will rotate or rock the rod 90 which will move the cleaning shoes 91 and 92 into engagement with the supporting wheels 4 and 3, for removing dirt from these wheels.

Sometimes during the travel of the corn planter across the field, the markers will get out of proper alinement with the marks which were made on the previous trip, and adjustment is then afforded, during the travel of the corn planter through the medium of the friction disk 87 as follows. The friction disk 87 is moved into engagement with the friction wheel 85, through the depression of a foot lever 104, which foot lever is connected to the medium of a rod 105 to a bell crank 106. The bell crank 106 is pivotally mounted as shown at 107 for horizontal pivotal movement, and it has a friction wheel 108 mounted upon its rear end which engages the outer surface of the friction disk and upon depression of the lever moves the disk 87 into engagement with the wheel 85. The disk 87 being mounted upon the axle 2 for rotation therewith, will rotate the wheel 85 by the travel of the corn planter, which will in turn rotate the shaft 6 through the meshing engagement between the gears 83 and 82 and cause this shaft to rotate in a higher rate of speed, than when it is rotated by the rotation of the front supporting wheels 73 and 74. The increased speed of rotation of the shaft 6 will consequently cause a forced rotation of the front supporting wheels 73 and 74, which will cause the markers 75 to move up until they aline with the marks formed on a previous trip, and properly position the markers, after which the foot lever 104 is released which relieves pressure of the wheel 108 upon the disk 107, permits the wheel 87 to rotate without imparting rotation to the wheel 85.

The front supporting wheels 73 and 74 are positioned outwardly of the seed dispensing mechanism substantially a distance equal to the distance between the seed dispensing mechanism and the center of the planter, so that when planting a field of corn one of the front supporting wheels will track in the track made by itself on a previous trip across the field, this will permit of planting all the rows parallel, and checking the hills of grain planted.

An ordinary tongue structure 115 is connected to the auxiliary supporting frame 5 and ordinary type of seat 116 is supported above the supporting frame 1 by a spring standard 117.

From the foreging description taken in connection with the accompanying drawings, the advantages of construction and of the method of operation of the improved corn planter will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a corn planter structure, the combination, of a supporting frame, seed dispensing means carried by said supporting frame, a pivoted pawl for controlling the dispensing of seeds, a lever pivotally connected to said supporting frame, said lever being operatively connected to said pivoted pawl, a shaft rotatably supported by said frame, a cam mounted upon said shaft and provided for engagement with said pivoted lever for rocking the lever for operating said pivoted pawl, said cam having two faces of unequal circumference for regulating the operation of said pawl for regulating the number of seeds deposited upon each operation of the pawl.

2. In a corn planter structure, the combination, of a supporting frame, seed dispensing means carried by said supporting frame, a pivoted pawl for controlling the dispensing of seeds, a lever pivotally connected to said supporting frame, said lever being operatively connected to said pivoted pawl, a shaft rotatably supported by said frame, a cam mounted upon said shaft and provided for engagement with said pivoted lever for rocking the lever for operating said pivoted pawl, said cam having two faces of unequal circumference for regulating the operation of said pawl for regulating the number of seeds deposited upon each operation of the pawl, and manually operable means for shifting said cam upon said shaft, furrow opening shoes carried by said frame, a grain guiding and delivering spout carried by said furrow opening shoes, a valve positioned in the lower end of said spout for controlling the delivery of seeds therefrom, and a cam mounted upon said shaft for operating said valve.

3. In a corn planter structure, seed dispensing means carried by said frame and including a rotary seed dropping plate, a pivotally mounted pawl for operating said rotary seed dropping plate, a lever pivotally carried by said supporting frame and operatively connected to said pawl, a shaft rotatably supported by said frame, a cam slidably mounted upon said shaft and adapted for engagement with said pivoted lever for rocking the lever for operating said pivoted pawl for rotating said seed dropping plate, stub axles connected to the ends of said shaft by means of universal joints, supporting wheels mounted upon said stub axles for rotating the axles and said shaft upon travel of the planter.

4. In a corn planter structure, a supporting frame, a seed dispensing mechanism carried by said frame, a shaft for operating said seed dispensing mechanism, a furrow opening shoe carried by said frame, a seed guiding and delivering spout carried by said furrow opening shoe, a pivoted valve mounted in the lower end of said spout, a rod connected to said valve, a cam lever pivotally carried by said frame and connected to said rod, a cam mounted upon said shaft for rocking said lever to operate said valve, an operating rod for said seed dispensing mechanism, a lever pivotally carried by said frame and connected to said rod for operating the seed dispensing mechanism upon rocking of the lever, a multiple face cam carried by said shaft, one end of said last mentioned lever engaging one of the faces of said cam for rocking the lever during rotation of said shaft.

5. In a corn planter structure, a supporting frame, a seed dispensing mechanism carried by said frame, a shaft for operating said seed dispensing mechanism, a furrow opening shoe carried by said frame, a seed guiding and delivering spout carried by said furrow opening shoe, a pivoted valve mounted in the lower end of said spout, a rod connected to said valve, a cam lever pivotally carried by said frame and connected to said rod, a cam mounted upon said shaft for rocking said lever to operate said valve, an operating rod for said seed dispensing mechanism, a lever pivotally carried by said frame and connected to said rod for operating the seed dispensing mechanism upon rocking of the lever, a multiple face cam carried by said shaft, one end of said last mentioned lever engaging one of the faces of said cam for rocking the lever during rotation of said shaft, said cam and said multiple face cam being arranged so that said dispensing mechanism operating lever will be operated when said valve is in a closed position.

6. In a corn planter structure, a seed dispensing mechanism including a hopper having a bottom provided with an outlet opening, a rotary dispensing disk positioned upon the upper surface of said bottom and provided with a plurality of openings formed in spaced relation about the disk, ratchet teeth formed upon the under surface of said disk, a pivoted pawl carried by the under surface of said bottom and adapted for engagement with said ratchet teeth for rotating said disk for moving certain of the openings carried thereby over said outlet opening, a rod connected to said pawl, means for moving said rod for operating said pawl, a spring connected to said pawl and said bottom for returning the pawl to its normal position after operation by the rod, and means for regulating the scope of movement of said pawl for regulating the number of disk carried openings passed over the outlet opening upon each operation of the pawl.

7. In a corn planter structure, a seed dispensing mechanism including a hopper having a bottom provided with an outlet opening, a rotary dispensing disk positioned upon the upper surface of said bottom and provided with a plurality of openings formed in spaced relation about the disk, ratchet teeth formed upon the under surface of said disk, a pivoted pawl carried by the under surface of said bottom and adapted for engagement with said ratchet teeth for rotating said disk for moving certain of the openings carried thereby over the outlet opening, a rod connected to said pawl, a pivotally supported lever connected to said rod, a multiple face cam for rocking said lever, and means for shifting said cam for shifting the different faces into engagement with said lever for regulating the scope of movement of the pawl to regulate the number of disk carried openings passing over said outlet opening.

8. In a corn planter structure, a seed dispensing mechanism including a hopper having a bottom provided with an outlet opening, a rotary dispensing disk positioned upon the upper surface of said bottom and provided with a plurality of openings formed in spaced relation about the disk, ratchet teeth formed upon the under surface of said disk, a pivoted pawl carried by the under surface of said bottom and adapted for engagement with said ratchet teeth for rotating said disk for moving certain of the openings carried thereby over the outlet opening, a rod connected to said pawl, a pivotally supported lever connected to said rod, a multiple face cam for rocking said lever, and means for shifting said cam for shifting the different faces into engagement with said lever for regulating the scope of movement of the pawl to regulate the number of disk carried openings passing over said outlet opening, and a spring connected to said pawl and said hopper bottom for returning said pawl to its normal position after operation by said rod.

9. In a corn planter structure, a supporting frame, an axle rotatably carried by said supporting frame, rear supporting wheels mounted upon said axle, a seed dispensing mechanism carried by said frame, a shaft rotatably supported by said frame and operatively connected to said seed dispensing mechanism for operating the seed dispensing mechanism upon rotation of the shaft, axles universally connected to the ends of said shaft, supporting wheels mounted upon said axles for rotating the axles and said shaft upon travel of the planter, marker plates carried by said front supporting wheels, a friction disk loosely mounted upon said first named axle, a second shaft operatively connected to said first named shaft, a friction wheel mounted upon said second shaft normally out of engagement with said friction disk, means for shifting said friction disk into engagement with said friction wheel, and a hand lever connected to said friction disk for rotating it for manually rotating said shaft and said front wheel.

10. In a corn planter structure, a supporting frame, an axle rotatably carried by said supporting frame, rear supporting wheels mounted upon said axle, a seed dispensing mechanism carried by said frame, a shaft rotatably supported by said frame and operatively connected to said seed dispensing mechanism for operating the seed dispensing mechanism upon rotation of the shaft, axles universally connected to the ends of said shaft, supporting wheels mounted upon said axles for rotating the axles and said shaft upon travel of the planter, marker plates carried by said front supporting wheels, a friction disk loosely mounted upon said first named axle, a second shaft operatively connected to said first named shaft, a friction wheel mounted upon said second shaft normally out of engagement with said friction disk, means for shifting said friction disk into engagement with said friction wheel, and a hand lever connected to said friction disk for rotating it for manually rotating said shaft and said front wheel, a second friction disk mounted upon said axle for rotation therewith and being normally held out of engagement with said friction wheel, and means for moving said second friction disk into engagement with said friction wheel for the arresting rotation of said first named shaft and said stub axle.

11. In a corn planter structure, a supporting frame, an axle rotatably carried by said supporting frame, rear supporting wheels mounted upon said axle, a seed dispensing mechanism carried by said frame, a shaft rotatably supported by said frame and operatively connected to said seed dispensing mechanism for operating the seed dispensing mechanism upon rotation of the shaft, axles universally connected to ends of said shaft, supporting wheels mounted upon said axles for rotating the axles and said shaft upon travel of the planter, marker plates carried by said front supporting wheels, a friction disk slidably mounted upon said first named axle for rotation therewith, a second shaft operatively connected to said first named shaft, a friction wheel mounted upon said shaft and normally out of engagement with said friction disk, and means for shifting said friction disk into engagement with said friction wheel for arresting rotation of said shaft and said second mentioned axles.

12. In a corn planter structure, a seed dispensing mechanism including a hopper having a bottom provided with an outlet opening, a rotary dispensing disk provided with a plurality of openings, ratchet teeth formed upon the under surface of said disk, a pivoted pawl carried by the under surface of said bottom and adapted for engagement with said ratchet teeth for rotating said disk for moving certain of the openings carried thereby over said outlet opening, a rod connected to said pawl, means for moving said rod for operating said pawl and means for regulating the scope of movement of said pawl for regulating the number of disk carried openings passed over the outlet opening upon each operation of the pawl.

13. In a corn planter structure, a supporting frame, a seed dispensing mechanism carried by said frame and including a hopper having a bottom provided with an outlet opening, a rotary dispensing disk provided with a plurality of openings, a rod operatively connected to said disk for rotating the disk for moving certain of the disk carried openings over said outlet opening, a pivotally supported lever connected to said rod, a shaft rotatably carried by said frame, a multiple faced cam feathered upon said shaft and adapted for rocking said lever, a sleeve slidably mounted upon said shaft, an arm pivotally supported by said frame, a rod connecting said arm and said cam for shifting said cam upon pivotal movement of said arm for shifting the different faces into engagement with said lever for regulating the scope of movement of the rod to regulate the number of disk carried openings passed over said outlet opening upon each operation of the rod.

14. In a corn planter structure, a supporting frame, a seed dispensing mechanism carried by said frame and including a hopper having a bottom provided with an outlet opening, a rotary dispensing disk provided with a plurality of openings, a rod operatively connected to said disk for rotating the disk for moving certain of the disk carried openings over said outlet opening, a pivotally supported lever connected to said rod, a shaft rotatably carried by the frame, a multiple faced cam feathered upon said shaft and adapted for rocking the lever, a sleeve slidably mounted upon said shaft, an arm pivotally supported by said frame and operatively connected to said sleeve, a rod connecting said arm and said cam for shifting said cam upon pivotal movement of said arm for shifting the different faces into engagement with said lever for regulating the scope of movement of the rod to regulate the number of disk carried openings passed over said outlet opening upon each operation of said rod, a bell crank pivotally carried by said frame and operatively connected to said sleeve, and a hand lever connected to said bell crank for sliding said sleeve for pivotally moving said arm.

15. In a corn planter structure, a seed dispensing mechanism including a hopper having a bottom provided with an outlet opening, a rotary dispensing disk provided with a plurality of openings, ratchet teeth formed upon the under surface of said disk, a pivoted pawl carried by said hopper bottom and adapted for engagement with said ratchet teeth for rotating said disk for moving certain of the openings carried thereby over said outlet opening, a rod connected to said pawl, a pivotally supported lever connected to said rod, a shaft rotatably carried by said frame, a multiple faced cam feathered upon said shaft and adapted for rocking said lever, a sleeve slidably mounted upon said cam, an arm pivotally supported by said frame and operatively connected to said sleeve, a rod connecting said arm and cam for shifting said cam upon pivotal movement of said arm for shifting the different faces into engagement with said lever for rotating the scope of movement of said pawl to regulate the number of disk carried openings passing over said outlet opening.

16. In a corn planter structure, a seed dispensing mechanism including a hopper having a bottom provided with an outlet opening, a rotary dispensing disk provided with a plurality of openings, ratchet teeth formed upon the under surface of said disk, a pivoted pawl carried by said hopper bottom and adapted for engagement with said ratchet teeth for rotating said disk for moving certain of the openings carried thereby over said outlet opening, a rod connected to said pawl, a pivotally supported lever connected to said rod, a shaft rotatably carried by said frame, a multiple face cam feathered upon said shaft and adapted for rocking said lever, a sleeve slidably mounted upon said cam, an arm pivotally supported by said frame and operatively connected to said sleeve, a rod connecting said arm and cam for shifting said cam upon pivotal movement of said arm for shifting the different faces into engagement with said lever for rotating the scope of movement of said pawl to regulate the number of disk carried openings passing over said outlet opening, a spring connected to said pawl and said hopper bottom for returning the pawl to its normal position after operation by the rod, and means for limiting the sliding movement of said cam.

In testimony whereof I affix my signature in presence of two witnesses.

CHARLES H. SMALLWOOD.

Witnesses:
C. H. TAYLOR,
R. R. COSBY.